United States Patent [19]

Peterson

[11] 4,187,524
[45] Feb. 5, 1980

[54] SERIES CAPACITOR PROTECTION EQUPMENT WITH EXTENDED RANGE DUAL SPARKOVER FEATURE

[75] Inventor: Charles A. Peterson, Van Buren Township, County of Monroe, Ind.

[73] Assignee: Westinghouse Electric Corp., Pittsburgh, Pa.

[21] Appl. No.: 876,819

[22] Filed: Feb. 10, 1978

[51] Int. Cl.² .............................................. H02H 7/16
[52] U.S. Cl. ........................................ 361/16; 361/56
[58] Field of Search ..................... 361/16, 15, 17, 54, 361/56

[56] References Cited

U.S. PATENT DOCUMENTS

| | | | |
|---|---|---|---|
| 2,207,577 | 7/1940 | Buell | 361/16 |
| 2,363,898 | 11/1944 | Partington | 361/16 |
| 2,401,009 | 5/1946 | Marbury | 361/16 |
| 2,862,152 | 11/1958 | Ryden | 361/16 |
| 3,889,158 | 6/1975 | Peterson | 361/16 |
| 4,121,270 | 10/1978 | Peterson | 361/16 X |

*Primary Examiner*—Patrick R. Salce
*Attorney, Agent, or Firm*—G. H. Telfer

[57] ABSTRACT

Where multiple bypass circuits are provided across the protected equipment and have different sensitivity to overvoltages, the more sensitive trigger gap circuit branch is coupled to the high voltage main spark gap by means including a pulse transformer to boost the voltage across the main gap rapidly upon firing of the trigger gap so that the trigger gap can be at a highly sensitive overvoltage level to minimize further any danger of transient mechanical subsynchronous shocks to the rotating shafts of large generators in a transmission system, while retaining the ability of delayed reclosing of the trigger gap branch following its operation to immunize it against post reinsertion transient voltages.

2 Claims, 3 Drawing Figures

SERIES CAPACITOR PROTECTION EQUPMENT WITH EXTENDED RANGE DUAL SPARKOVER FEATURE

BACKGROUND OF THE INVENTION

The invention relates generally to overvoltage protection equipment for electrical apparatus and particularly to that useful for series capacitor installations in high voltage alternating current transmission lines.

Reference is made to U.S. Pat. No. 3,889,158, June 10, 1975, by the present inventor whose description is incorporated herein by reference in its entirety and which sets forth an invention upon which the present invention is an improvement.

The prior patent provides an arrangement of protection equipment that goes beyond what was previously used for capacitor protection in that the series capacitor bank can be bypassed at an overvoltage level that is not high enough to present any danger to the series capacitors themselves, but which is of a magnitude that may give rise to system transients producing oscillating shocks on the rotating shafts of generation equipment coupled to the transmission line. It is desirable that this protection level be as low as possible but conflicting requirements are encountered because a lower voltage protection level means the capacitors are removed from the system more readily and more frequently, during which time they are not performing their intended function, and they have to be restored rapidly after fault clearing. The reinsertion problem was addressed in the prior patent and solved by having a "dual sparkover" feature, namely a pair of trigger gaps of different voltage level. When the more sensitive trigger gap fires it causes the other trigger gap and the main spark gap also to fire, upon which the circuit of the most sensitive trigger gap is opened and it is disabled for a period of time to permit clearing of post reinsertion transients. While the first trigger gap is disabled, the second, less sensitive, trigger gap is in the system and provides protection against any overvoltage that could damage the capacitors.

Such a system can be practically implemented where the overvoltage levels of the two trigger gaps have a limited difference. For example, the specific example of the prior patent permits firing the first trigger gap at about 2.0 to 2.5 per unit (P.U.), i.e., 2.0 to 2.5 times the normal rated capacitor voltage level, while the second trigger gap is fired at a sparkover level of about 3.5 P.U. and the main spark gap, a larger current capacity gap, normally a carbon gap, has a sparkover of about 4 P.U. At such levels the system can be successfully operated. However, it is possible that before the first trigger gap goes at 2.0 to 2.5 P.U. there could be harmful transients produced that endanger the generating equipment. It is hence desirable to provide a scheme which permits removal of the capacitors at a lower overvoltage consistent with other system requirements including effective firing of the main spark gap and effective rapid reinsertion of the capacitors.

Reference is also made to copending application Ser. No. 767,185, filed Feb. 9, 1977, by the present inventor and assigned to the present assignee, now U.S. Pat. No. 4,121,270, issued Oct. 17, 1978, which provides one form of solution to the foregoing problem. In the pending application instead of a dual sparkover system there is provided a single bypass spark gap with means for force firing the spark gap upon the occurrence of any of a variety of system conditions that could result in subsynchronous oscillation. The force firing circuit includes a capacitive potential device supplying power to energize a firing control circuit with a pulse transformer placing high frequency voltage across the protective device or spark gap for rapid bypassing and also rapid reinsertion of the series capacitor bank. While such equipment is effective and provides a degree of flexibility to satisfy varying system performance conditions, it also requires greater complexity of equipment and higher cost than a dual sparkover scheme.

The present invention came about as a result of efforts to improve upon the dual sparkover scheme of the aforementioned issued patent.

SUMMARY OF THE INVENTION

In accordance with the present invention multiple bypass circuits are provided across the protected equipment and have different sensitivity to overvoltages. The more sensitive trigger gap circuit branch is coupled to the high voltage main spark gap by means including a pulse transformer to boost the voltage across the main gap rapidly upon firing of the trigger gap so that the trigger gap can be at a highly sensitive (i.e., low) overvoltage level to minimize further and danger of transient mechanical subsynchronous shocks to the rotating shafts of large generators on the transmission system. The ability of delayed reclosing of the trigger gap branch following its operation to immunize it against post reinsertion transient voltages is retained.

The present invention permits the low voltage trigger gap to be set at a low level arbitrarily close to 1.0 P.U., preferably no more than about 50% greater than the normal voltage (1.5 P.U.) as compared with a setting of about 2.0 or 2.5 for the apparatus of the prior patent. (However, the ability is retained to operate at higher trigger gap levels, such as 2.0 to 2.5 P.U. if desired for any purpose.) The second trigger gap may as before have a setting of its protection level at about 3.5 P.U. while the main gap, inherently somewhat less precise in its sparkover characteristic, has a setting of about 4.0 P.U. Thus, there is now achievable protection against subsynchronous oscillation over a much wider range of overvoltages while the features of the prior patent as to the disablement of the low voltage trigger gap during reinsertion is retained.

In carrying out the present invention it is found to be important to consider all of the impedances in the bypass circuitry. One possible form of practicing the invention is to have the pulse transformer primary in line with the sensitive trigger gap and its secondary directly connected across the main spark gap. However, the damping reactor normally present and preferred for use in the bypass circuitry for current limiting contributes losses which interfere with the rapid buildup of voltage across the main gap where the transformer secondary is directly across it. It is hence preferred to employ an arrangement in which the loss effects of the reactor are reduced by isolating the reactor from the pulsing circuit. This increases the available energy in the pulsing system and raises the frequency of the pulsing system, as a further aid in reducing losses through the reactor. The result is in the preferred form of the invention a separate circuit branch containing the secondary of the pulse transformer which applies the multiplied voltage to a storage capacitor which is in turn in series with a further spark gap, referred to as a slave gap, whose firing insures rapid firing of the main gap without substantial interference due to losses in the reactor.

DESCRIPTION OF PREFERRED EMBODIMENTS

Figure 1:
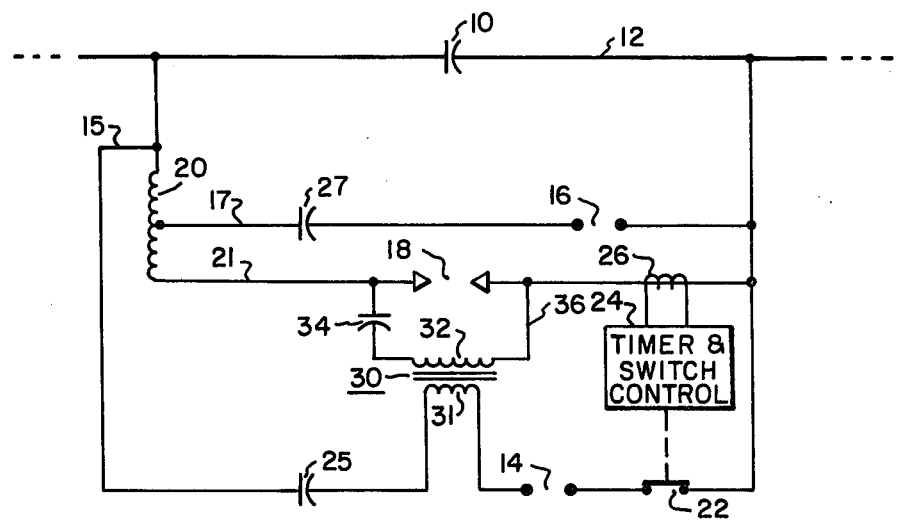
FIG. 1 is a circuit schematic of one embodiment of the present invention.

Referring to FIG. 1, there is shown a circuit embodying a form of the invention, although not as preferred as that to be subsequently described.

A capacitor 10 is shown representing a single or multiple unit capacitor bank connected in series in an alternating current transmission line 12 which is ultimately connected to one or more power generating stations (not shown) whose rotating shafts are to be safeguarded against subsynchronous oscillation by the protective equipment of the series capacitor.

The protective apparatus comprises first, second and third overvoltage protection means 14, 16 and 18 in parallel relation with each other and with the series capacitor 10. Each of the overvoltage protection means is preferably a spark gap, or series of spark gaps. The first and second spark gap devices 14 and 16 are sometimes referred to herein as trigger gaps because they have relatively precise sparkover voltage levels and are provided to have reliable sparkover occur at such overvoltage levels while the third spark gap device 18 is a larger, higher current capacity device of somewhat less precision in its sparkover voltage level. The latter gap 18 is sometimes referred to herein as the main gap or the carbon gap, since it is normally comprised of carbon electrodes.

In accordance with the above-mentioned U.S. Pat. No. 3,889,158, the first trigger gap 14 has the most sensitive sparkover level, a level below that required merely for protection of the series capacitor unit 10 itself, in order to reduce magnitude of subsynchronous oscillations on the system. The second trigger gap 16 is set at the protection level required for the series capacitor unit 10. The third or main spark gap 18 is set at a somewhat higher level.

Also in accordance with the issued patent, first and second circuit branches 15 and 17 containing the first and second spark gaps, respectively. Also include in series with each of the gaps a trigger capacitor 25 and 27 for facilitating the triggering and build up of voltage across the second branch 17 after the first branch 15 is conductive and reducing the current discharge through the trigger gaps for long life of the components.

A damping or current limiting reactor 20 is shown connected as usual effectively in a third circuit branch 21 containing the main spark gap 18 with a portion of the reactor also being connected in the second circuit branch 17 while the first circuit branch does not include the reactor. While the distribution of the inductive reactance may be varied from that shown, the general use thereof entails applying the maximum inductance in series with the main gap 18 and successively lesser amounts in series with the second and first trigger gaps 16 and 14 respectively.

A switch 22 in the first circuit branch 15 is controlled by a timer and switch control 24 which is supplied signals from a current transformer 26 on the circuit branch 21 containing the main gap 18 so that when the main gap fires the switch opens to disable the first trigger gap 14 for a period of time sufficient to allow the clearing of the fault and the reinsertion of the capacitor unit 10, all of which is in accordance with the issued patent.

The first trigger gap 14 has, in accordance with the present invention, in series with it the primary, low voltage, winding 31 of a pulse transformer 30. In the embodiment of FIG. 1, the secondary, high voltage winding 32 of the pulse transformer 30 is connected directly across the main spark gap 18, with the possible inclusion of a voltage limiting capacitor 34 in the branch 36 containing the secondary winding. The pulse transformer 30 is located and arranged so as to rapidly boost the voltage across the main gap 18 upon the firing of the initial spark gap 14 even though the first spark gap is set for a relatively low level such as only about 50% greater than normal line voltage (1.5 P.U.), or less.

With the protection level of the first trigger gap 14 close to the nominal rated voltage level on the series capacitor 10, such as no more than about 150% of that voltage rather than 200 or 250% of that voltage as in the specific embodiment of the issued patent, considerably greater reduction of transient mechanical forces on generator shafts is provided. It is made possible to use such a low level first trigger gap 14 by the use of the pulse transformer 30 to rapidly build up the voltage across the main gap 18 to insure its firing. The nature of the gap 14 is such that it cannot sustain the high current levels to which it would be exposed without the firing of the main gap 18 or it would be damaged and be impaired for its further operation.

When the trigger gap 14 fires relatively high voltage is applied to the pulse transformer primary winding 31 and the trigger capacitor 25. This causes a high frequency capacitor charging current to flow through the transformer primary winding 31. The resulting high frequency, high voltage output of the transformer secondary and higher voltage winding 32 causes the main protective gap 18 to spark over and discharge the series capacitor bank 10. Once the main gap 18 is conducting, it will continue to conduct until at least the fault current is cleared. The gap current will be sensed by the current transformer 26 and open the switch 22 removing the low gap 14 and raise the protective level to the level set on the higher trigger gap 16 for a predetermined time which may be adjustable such as within the range of 0.5 to 10 seconds.

The arrangement of the current transformer 26 and the timer and switch control 24 and switch 22 in the branch containing the first trigger gap are the same as in the dual sparkover arrangement of the issued patent.

The voltage limiting capacitor 34 is provided in the pulse transformer secondary circuit 36 reducing the steady state voltage on the pulse transformer 30.

The reactor 20 is required to limit current discharge of the capacitor bank. It can also be taken advantage of in the triggering system to help isolate the pulsing system from the series capacitors to raise the buildup of the voltage pulse on the main carbon gap to cause it to spark over. However, as will be described below, assurance of better isolation can be provided by other means which is preferred.

A test circuit was constructed and tested by charging a capacitor bank of 200 microfarads and then discharging the bank and monitoring the voltage across the carbon gap 18 set at 25 kilovolts peak. The pulse transformer had its primary winding across the capacitor bank to operate with a primary voltage of 5 kv peak and a secondary voltage of 25 kv. The primary and secondary windings were each in series with respective capacitors of 0.04 microfarads between which were connected a reactor of 265 microh. The firing of a trigger gap was simulated by closing a switch in the primary winding circuit.

The test results showed that for different values of capacitance in series with the pulse transformer windings the voltage across the main gap could be raised to no greater than about 1.4 times the charge voltage on the 200 microfarad capacitor bank which was insufficient for its firing. Current and voltage measurements indicated that voltage buildup on the carbon gap was limited by losses through the reactor having an inductance of 265 microhenries. Consequently in the particular system application of interest the circuit of FIG. 1 is not regarded as desirable. In other system applications, such as where the large transformer ratio can be used, feasibility may be obtained.

Figure 2:
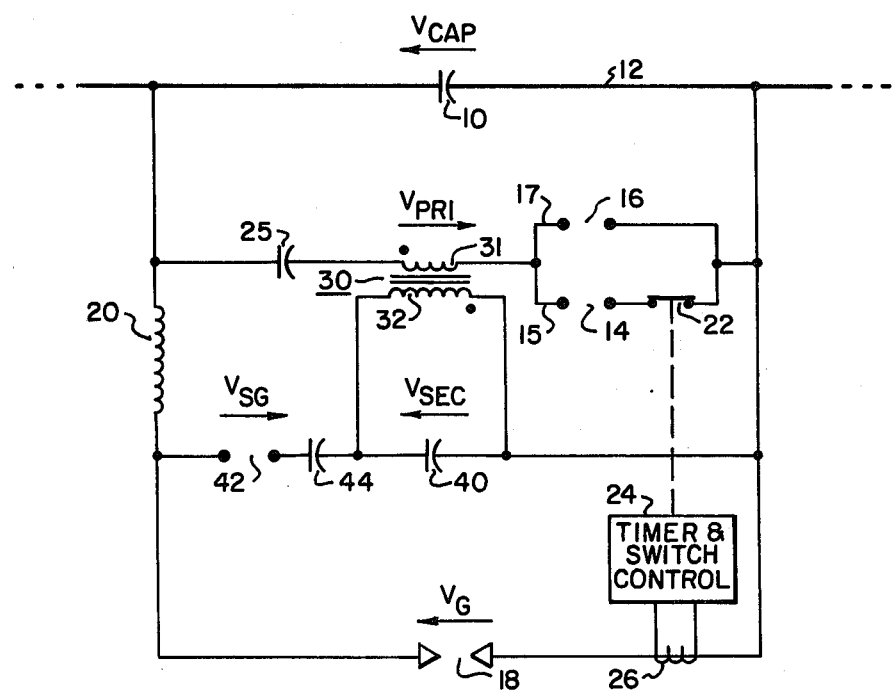
FIG. 2 is a circuit schematic of another embodiment of the invention.

Because of the needs of a particular application the arrangement illustrated in FIG. 2 was devised which provides surer isolation of the reactor 20 from the pulsing circuit. While generally similar to that of FIG. 1, this arrangement does not have the pulse transformer secondary 32 directly across the carbon gap. Instead that winding 32 is connected across a capacitor 40 for energy storage which is in series with a slave spark gap 42 and also an addiitional trigger capacitor 44. Note, also, branches 15 and 17 contain in common primary winding 31 and capacitor 25.

To test the circuit, the series capacitor 10 is charged to 1.5 P.U. and the low level trigger gap 14 is set to spark over at 1.5 P.U. The low lever tirgger gap sparkover allows current to flow into the pulse transformer primary winding 31. The total energy permitted in the transformer is limited by the value of capacitance in capacitor 25. The secondary voltage of the pulse transformer charges capacitor 40 up to a maximum voltage of the low level trigger gap sparkover (1.5 P.U.) times the transformer ratio. It is to be noted that the transformer polarity charges capacitor 40 in the opposite polarity.

As the voltage increases on capacitor 40, the voltage across the slave gap 42 will rise and approach its sparkover level. When the slave gap sparks over, a fast ringing current is caused by the dumping of charged capacitor 40 into the capacitance of the 265 microhenry reactor 20 and capacitance of the carbon gap 18. This causes a voltage buildup above the sparkoever level of the carbon gap. The carbon gap sparks over and the bank is discharged through the reactor 20.

The slave gap 42 has a sparkover level higher than that of the carbon gap 18 but less than what can be provided by the charge on capacitor 40. The carbon gap sparkover will occur on its first negative peak after the slave gap fires or, at worst, on the first positive voltage peak.

Figure 3:
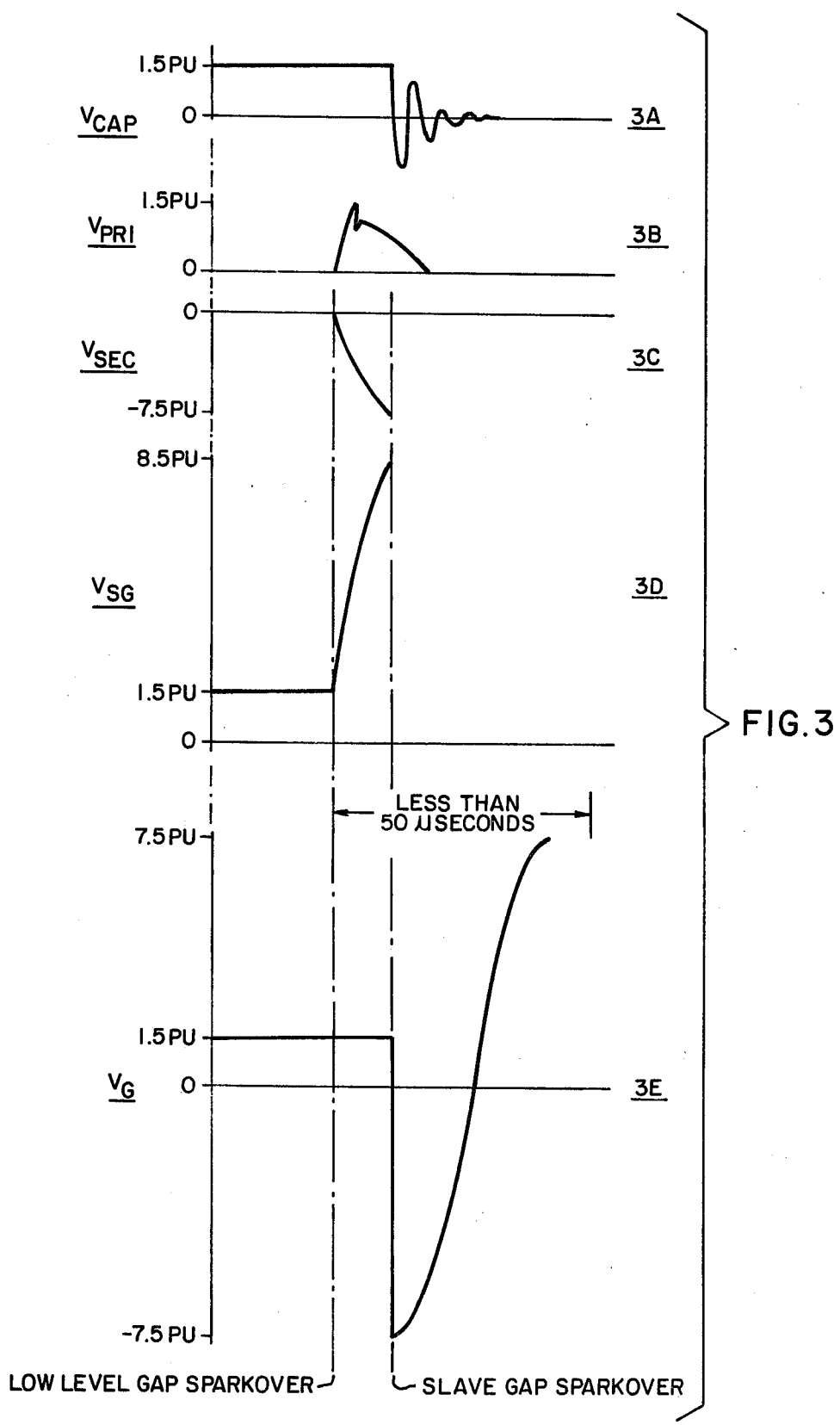
FIG. 3 shows voltage waveforms in curves 3A through 3E illustrating the operation of the circuit of FIG. 2.

FIG. 3 illustrates voltage waveforms at various points of a circuit simulating operation of the circuit of FIG. 2 for demonstrating the ability of the carbon gap to be sparked over within less than 50 microseconds of the sparkover of the low level trigger gap. (Note the $V_{CAP}$ in curve 3A decays at the natural ringdown frequency of the capacitor bank, typically 600 to 1000 hz, actually a lower frequency than the oscillation across $V_G$ in 3E, which may be about 20 kHz. So the time scales of the parts of FIG. 3 vary.)

Consequently, the arrangement of FIG. 2 insures reliable operation of the main spark gap even with a very low level trigger gap and can be made to function consistent with the performance of the dual sparkover scheme of the prior patent.

While certain exemplary embodiments are disclosed, it will be understood that variations in accordance with known practice may be made consistent with the use of the present invention.

I claim:

1. Series capacitor equipment comprising:
    a main capacitor connected in series in an alternating current transmission line;
    a first circuit branch connected across said main capacitor and including a first trigger spark gap having a first overvoltage protection level;
    a second circuit branch connected across said main capacitor and including a second trigger spark gap having a second overvoltage protection level higher than said first protection level;
    a third circuit branch connected across said main capacitor and including a main spark gap;
    means for disabling said first circuit branch upon the occurrence of a sparkover of said main spark gap and for restoring said first circuit branch to its original operating condition at a predetermined time after it is disabled;
    voltage buildup means for ensuring rapid operation of said second trigger spark gap and said main spark gap upon initial operation of said first trigger spark gap, said voltage buildup means comprising a pulse transformer with a primary winding connected in series with said first trigger spark gap across said main spark gap, and with a secondary winding operatively connected to apply a voltage pulse of a magnitude to said main spark gap causing its operation quickly after initial operation of said first overvoltage protection means;
    said voltage buildup means pulse transformer having its primary and lower voltage winding in series with both said first and second trigger spark gaps and forming part of both said first and second circuit branches; and
    said pulse transformer having its secondary and higher voltage winding connected in a fourth circuit branch across said main capacitor, said second winding being connected to charge capacitive means arranged in series with a slave spark gap which sparks over to cause rapid voltage buildup across said main spark gap.

2. Series capacitor equipment in accordance with claim 1 wherein:
    said first overvoltage protection level is no more than about 150% of the nominal rated voltage level of said main capacitor;
    said first and second trigger spark gaps are relatively precise in their firing characteristic as compared with said main spark gap; and
    said main spark gap has a larger current capacity than said first and second trigger spark gaps.

* * * * *